Jan. 4, 1944.   V. VOORHEES   2,338,606
TRANSFERRING SUBDIVIDED SOLIDS
Filed Sept. 30, 1941
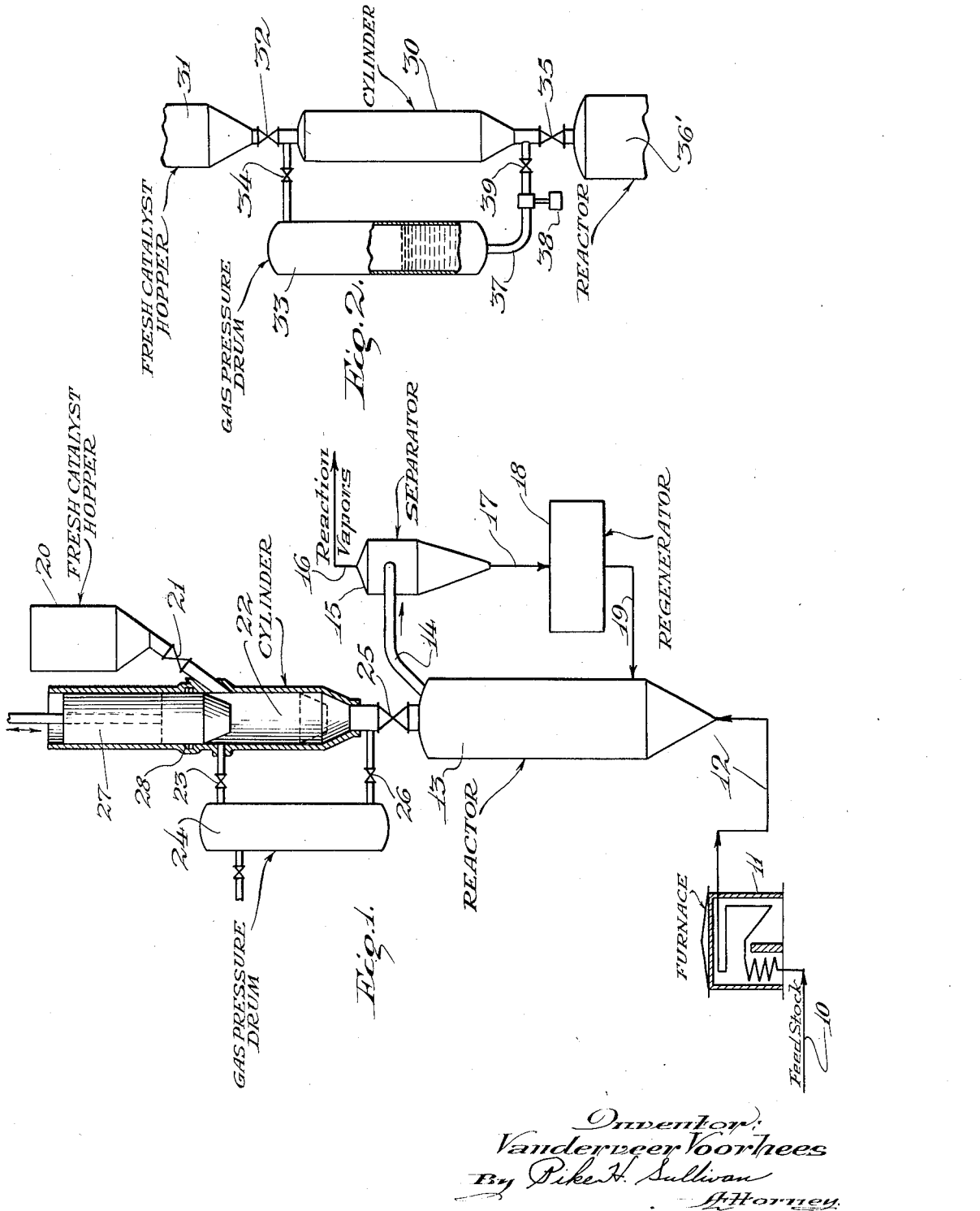

Patented Jan. 4, 1944

2,338,606

UNITED STATES PATENT OFFICE 2,338,606

TRANSFERRING SUBDIVIDED SOLIDS

Vanderveer Voorhees, Homewood, Ill., assignor to Standard Oil Company, Chicago, Ill., a corporation of Indiana Application September 30, 1941, Serial No. 412,965

6 Claims. (Cl. 214—17)

This invention relates to the handling of solids and particularly granulated solids and powders. More especially the invention relates to the transfer and introduction of subdivided solids into reaction vessels operating under pressure.

Hitherto, it has been difficult to transfer solids against a substantial back pressure where the pressure may amount to as much as 50 or 100 pounds per square inch and the problem is increasingly more difficult at higher pressures, for example, 200 to 500 pounds per square inch. The ordinary methods of handling powdered solids by using blowers and by gravity are only suitable for transferring against low pressure differentials. It is the object of this invention to provide an apparatus and method for transferring subdivided solids against substantial back pressures. A further object of the invention is to effect the transfer of solids into reaction vessels operating under pressure in an economical manner and without the simultaneous introduction of large amounts of carrier fluids. The invention is illustrated by means of a drawing in which Figure 1 shows schematically an apparatus employing a mechanical piston and Figure 2 shows an apparatus employing a liquid piston. The apparatus in Figure 1 illustrates the application of my solid injection method to the catalytic conversion of hydrocarbon oils.

The following description of my process and apparatus applies particularly to its application to the reforming of gasoline to increase the knock rating. Referring to Figure 1, heavy naphtha stock of low knock rating is introduced along with hydrogen by line 10 into pipe furnace 11 and thence conducted by transfer line 12 to the reactor 13 where the hydrocarbon vapors flow upward at high temperature, for example, 850 to 1050° F., in contact with a suspended, solid catalyst. The catalyst employed for this purpose is in granulated or powdered form having a particle size largely within the range of 2 to 100 microns. A typical catalyst gave the following analysis for particle size:

| | Per cent |
|---|---|
| 0 to 10 microns | 25 |
| 10 to 20 microns | 13 |
| 20 to 40 microns | 20 |
| 40 to 80 microns | 29 |
| Above 80 microns | 13 |

Expressed in screen sizes, the catalyst will usually fall within the range of 10 to 300 mesh, although 400 mesh and finer material will usually be present. Powders of this character have the property of flowing freely under the influence of gravity and when properly aerated, they may be forced through pipes against moderate back pressures. In the cracking of heavy hydrocarbon oils the catalysts consist essentially of metal oxides and activated natural minerals, clays, etc. Acid activated montmorillonite is an example. Metal oxides of the type of active silica and alumina, silica gel, magnesia, etc., singly or in admixture with one another may be employed. For the reforming of low knock rating naphthas, I prefer to employ oxides of the Vth and VIth group metals, such as vanadia, chromia and molybdena, preferably supported on active alumina, magnesia or other metal oxides of the IInd and IIIrd group metals. I also prefer to employ about 1 to 4 mols of hydrogen per mol of hydrocarbon treated.

The catalyst and hydrocarbon vapors flow from the top of reactor 13 by line 14 to catalyst separator 15, which may be of the cyclone type, where the catalyst is removed and vapors substantially free of catalyst are withdrawn by line 16 leading to product recovery and separation, not shown. The catalyst is conducted by line 17 to a regenerator 18 wherein it is contacted with air or other oxygen-containing gas mixture to remove carbonaceous deposits and effect reactivation. A regeneration temperature of 1000 to 1200° F. is usually satisfactory. The regenerated catalyst, preferably free from regeneration gases, is conducted by line 19 back to reactor 13. The entire system of reactor, catalyst separator and regenerator is suitably kept under about the same pressure, thereby facilitating the transfer of catalyst therebetween. However, if desired, the regenerator may be operated at a low pressure and regenerated catalyst may be returned to the reactor by means herein provided.

Because of losses in catalyst from the system and because of the progressively lowering catalyst activity requiring discard of catalyst, it becomes necessary from time to time to add additional catalyst. Where the system is operated under pressure as in the case of hydroforming of oils in the presence of hydrogen, makeup catalyst may be introduced into reactor 13 in the following manner: Fresh catalyst from supply 20 is introduced by valve 21 into cylinder or injection chamber 22 and valve 21 is then closed. Valve 23 is next opened admitting into cylinder 22 gas from pressure drum 24. However, part of the gas from 24 may be admitted by valve 26 to supply aeration to the catalyst in 22. For this purpose an inert gas or a hydrocarbon gas may be employed, e. g., gas produced in the reforming process and separated from the products in line 16 may be used to maintain the pressure of the gas in drum 24. It is desirable that the pressure in drum 24 be substantially the same or slightly higher than the pressure in reactor 13. Thus, where the pressure in reactor 13 is 250 pounds, gas chamber 24 may have a pressure of about 250 to 255 pounds.

Valve 25 is now opened permitting catalyst to fall into reactor 13, the space in 22 being filled by gas from 24. If desired, a bellows, cylinder, or other metering device may be employed to allow only sufficient gas to flow from 24 into 22 to replace the catalyst therein. In large scale conversion operations the amount of catalyst charged to the reactor may conveniently be between 100 and 1000 pounds. After chamber 22 has become emptied of catalyst, valves 25 and 23 are closed. Valve 25 is suitably of the rotating plug type or of the slide or gate type. Valve 26 is then opened allowing the bottom of chamber 22 to communicate with the gas reservoir 24 and while valve 26 remains open, plunger 27 is forced downward mechanically into chamber 22 substantially filling it and forcing gases therefrom back into reservoir 24. Leakage of gas past plunger 27 is prevented by packing rings 28. Valve 26 is then closed and the plunger is retracted, restoring the pressure in 22 to substantially atmospheric pressure. Valve 21 is opened again to admit more catalyst to 22 and the cycle of operations is repeated. It should be understood that the entire operation is preferably made automatic by suitable links between valves and plunger.

Instead of a mechanical piston or plunger 27 I may employ a fluid piston which is diagrammatically shown in Figure 2. According to this method catalyst is introduced into cylinder 30 from catalyst supply 31. Valve 32 is closed and gas from chamber 33 is admitted through valve 34 into the upper part of the drum 30 to establish therein a gas pressure substantially equal to that within the drum 33. Discharge valve 35 is next opened and the catalyst charge falls into the reaction vessel 36. Valve 35 is then closed. A suitable liquid is now transferred from the base of drum 33 through line 37, pump 38 and valve 39 to drum 30 which is filled, expelling the gas through valve 34 back to chamber 33. Valve 34 is now closed and the liquid is pumped again from cylinder 30 back to the liquid supply at the bottom of chamber 33 leaving chamber 30 empty and at about atmospheric pressure. Valve 39 is then closed and valve 32 is opened permitting catalyst to enter the cylinder and the operation is ready to be repeated.

A suitable liquid for forming the liquid piston shown in Figure 2 may be oil, water or even mercury, although the comparatively high cost of the latter liquid practically prohibits its use. Inasmuch as some of the liquid may adhere to the walls of chamber 30, it is desirable to employ for the purpose a liquid which will not complicate the operation of the catalytic conversion system. Water may be employed or various oils may be used for the purpose in the conversion of naptha just described. Charging stock to the process may be employed as a piston liquid in 33. Also, instead of retaining the piston liquid in the gas supply drum 33, I may provide a separate drum for this purpose.

My apparatus and method of introducing catalyst has been described particularly as it applies to adding makeup catalyst. However, all of the catalyst in a reforming or cracking system may be added in this way. It has heretofore been proposed to introduce powdered conversion catalysts into hydrocarbon conversion systems by preparing a slurry of the catalyst and hydrocarbon. Where the proportion of catalyst employed is low, this method is fairly satisfactory but where the proportion of catalyst is high, as in the case of conversion of heavy hydrocarbon oils and the catalytic reforming of naptha, the slurry method is not feasible because of the large amount of liquid required to carry the catalyst. Thus, where the volume of catalyst employed is equal to the volume of oil or where it exceeds the volume of oil by 3 to 5 or even 10 times, the resulting mixture of catalyst and oil is not pumpable. By employing my system, any desired ratio of catalyst to oil may be employed in oil conversion.

I may also apply my method of handling powdered solids to the transfer of other powders such as powdered coal in a coal coking or coal hydrogenation system. Thus, in the hydrogenation of coal, it is frequently necessary to introduce powdered coal or powdered lignite into a reaction vessel operating at a pressure within the range of about 2000 to about 4000 pounds per square inch, and my method offers considerable economic advantage over the slurry methods used heretofore.

Having thus described my invention, what I claim is:

1. The process of transferring subdivided solids from a low pressure zone to a high pressure zone which comprises charging said solids to an intermediate low pressure zone, introducing gas from a high pressure gas supply into said intermediate zone sufficient to raise the pressure therein substantially to that of said high pressure zone, transferring said solids from said intermediate zone to said high pressure zone leaving said intermediate zone filled with gas and then forcing said gas by means of a mechanical piston from said intermediate zone back to said gas supply substantially without reduction of pressure.

2. The process of transferring subdivided solids from a low pressure zone to a high pressure zone which comprises charging said solids to an intermediate low pressure zone, introducing gas from a high pressure gas supply into said intermediate zone sufficient to raise the pressure therein substantially to that of said high pressure zone, transferring said solids from said intermediate zone to said high pressure zone leaving said intermediate zone filled with gas and then forcing said gas by means of a liquid piston from said intermediate zone back to said gas supply substantially without reduction in pressure.

3. The process of introducing powdered, solid catalyst into a hydrocarbon conversion zone operating under high pressure which comprises charging said catalyst to an injection zone at low pressure, injecting gas into said injection zone until the pressure is substantially the same as that of said conversion zone, transferring catalyst from said injection zone to said conversion zone by the action of gravity, then displacing the gas from said injection zone without substantial reduction in pressure and finally restoring said low pressure in said injection zone by withdrawing the displacing means therefrom.

4. An apparatus for injecting a powdered solid catalyst into a vessel operating under substantial pressure which comprises a low pressure catalyst supply, a catalyst injection chamber and a compressed gas reservoir, means for maintaining the pressure of gas in said reservoir at about the same pressure as that of said vessel, means for introducing catalyst from said supply to said injection chamber, a valved communication between said gas reservoir and said injection chamber, a valved communication between said injection cylinder and said vessel, a valved communication between the bottom of said injection chamber and said gas reservoir and a piston adapted to force gas from said injection chamber into said gas reservoir after discharging said powdered solid catalyst into said vessel.

5. An apparatus for injecting powdered solid catalyst into a system operating under pressure which comprises a low pressure catalyst supply, an injection zone communicating with said catalyst supply and with said high pressure system and a high pressure gas reservoir, valve means for admitting catalyst from said low pressure supply into said injection chamber, a valved conduit between said gas reservoir and said injection chamber, valve means for admitting catalyst from said injection chamber into said high pressure system, means for filling said injection chamber with liquid and forcing the gas contained therein back to said reservoir and means for removing said liquid from said injection chamber.

6. The apparatus of claim 5 wherein said gas reservoir communicates with a liquid reservoir and said means for filling said injection chamber with liquid comprises a pump connected for transferring liquid to and from the bottom of said chamber and said liquid reservoir.

VANDERVEER VOORHEES.